US005638676A

United States Patent [19]

Müller

[11] Patent Number: 5,638,676

[45] Date of Patent: Jun. 17, 1997

[54] FLUID POWER CYLINDER

[75] Inventor: Lothar Müller, Esslingen, Germany

[73] Assignee: Festo KG, Esslingen, Germany

[21] Appl. No.: 552,074

[22] Filed: Nov. 3, 1995

[30] Foreign Application Priority Data

Nov. 7, 1994 [DE] Germany ........................ 44 39 667.8

[51] Int. Cl.$^6$ ........................ F16D 31/02

[52] U.S. Cl. ........................ 60/407; 60/413; 92/82

[58] Field of Search ........................ 92/82; 91/47, 462, 91/522, 523, 530; 60/407, 413, 416

[56] References Cited

U.S. PATENT DOCUMENTS

| | | | |
|---|---|---|---|
| 2,932,951 | 4/1960 | Ottestad et al. | 60/407 X |
| 3,023,740 | 2/1962 | Samuel et al. | 91/163 |
| 3,910,045 | 10/1975 | Herrmann | 91/530 X |
| 4,188,858 | 2/1980 | Plunkett | 92/85 R X |
| 5,144,883 | 9/1992 | Muller et al. | 92/85 R X |
| 5,279,120 | 1/1994 | Sasaki | 60/413 |

FOREIGN PATENT DOCUMENTS

| | | | |
|---|---|---|---|
| 2001387 | 8/1971 | Germany | 60/413 |
| 2113788 | 10/1972 | Germany | 60/413 |
| 32 28 109 A1 | 2/1984 | Germany . | |
| 38 07 889 A1 | 9/1989 | Germany . | |
| 9016135 U | 5/1991 | Germany . | |
| 57-161304 | 10/1982 | Japan | 91/530 |

*Primary Examiner*—F. Daniel Lopez
*Attorney, Agent, or Firm*—Hoffmann & Baron

[57] ABSTRACT

The fluid power cylinder possesses a housing, wherein a piston space is defined to accommodate a piston. In or on the housing a pressurized fluid receiver is arranged which possesses at least one receiver chamber connected with the piston space and which is supplied from a pressurized fluid source. Such a fluid power cylinder is characterized by reliable operation and good response behavior if it is run at a considerable distance from the pressurized fluid source.

7 Claims, 2 Drawing Sheets

FLUID POWER CYLINDER

BACKGROUND OF THE INVENTION

The invention relates to a fluid power cylinder comprising a housing in which a piston space is defined for a piston able to be driven in response to fluid actuation.

THE PRIOR ART

Fluid power drive cylinders of this type are well known in the fluid power art and are widely employed as a component of fluid power networks. In pneumatic power systems a compressor functions as a source of pressurized fluid which supplies a receiver, whence the compressed air is supplied to associated drive cylinders via pipes or hose.

The compressed fluid receiver serves to compensate for fluctuations in pressure within a network in order in this manner to ensure an operating pressure which is as constant as possible for all loads.

Despite the provision of large compressed air receivers problems frequently occur as regards providing a sufficient pressure level, should a large number of fluid power cylinders in the network be simultaneously operated. Such a problem may for example occur on railroads, when the doors of many carriages are simultaneously opened at particular stations. In this case there is frequently insufficient operating pressure at some of the doors to ensure prompt opening or closing.

SHORT SUMMARY OF THE INVENTION

One object of the invention is consequently to take suitable steps to improve the response behavior of a drive cylinder irrespectively of the distance from the source of fluid under pressure.

In order to achieve these and/or other objects appearing from the present specification, claims and drawings, in the present invention a drive cylinder of the type initially mentioned is so designed that its housing possesses a pressurized fluid receiver which is adapted to be supplied by a pressurized fluid source and is provided with at least one receiver chamber connected with the piston space in a fluid conducting manner.

Accordingly the fluid power cylinder comprises its own pressurized fluid receiver which is provided on or in the housing of the cylinder. The fluid power cylinder and the pressurized fluid receiver may consequently constitute a coherent sub-assembly which unites the fluid power cylinder itself and the pressurized fluid receiver in a compact structure. In the direct vicinity of the piston space of the fluid power cylinder the pressurized fluid receiver makes available a volume of pressurized fluid having a size which may be easily designed to provide the quantity of pressurized fluid on call for ensuring the desired cylinder function in a reliable fashion. Owing to the proximity to the piston space there are extremely short fluid paths so that there will be no substantial drop in pressure and the fluid power cylinder will possess a very good response behavior.

The combination of the fluid power cylinder with a pressurized fluid receiver opens up many different possibilities as regards design and application, which inter alia are dependent on whether the chamber of the pressurized fluid receiver is constantly connected with at least one working chamber of the fluid power cylinder or whether control elements are placed in the fluid connection, which render possible a control of the passage cross section or aperture.

Advantageous further developments of the invention may be gathered from the claims.

In accordance with a particularly low-cost design in accordance with the invention the pressurized fluid receiver constitutes an integral component of the housing, the at least one receiver chamber being arranged together with the piston space in one and the same housing. Such a compact unit may be designed in an advantageous manner if the tubular section constituting the housing is in the form of an extruded or drawn component, in which the piston space and the receiver chamber are integrally formed.

In the case of a particularly compact structure the piston space possesses an ellipse-like oval cross section and the cross section of the receiver chamber is rectangular in form.

In the case of a design in which the chamber of the pressurized fluid receiver is constantly connected with the one working chamber of the piston space, the pressurized fluid receiver may be utilized to form a pressurized fluid spring and more particularly a pneumatic spring, which biases the piston toward an initial position thereof. When it is displaced the piston works against a fluid cushion, the counter pressure preferably being able to be set by an excess pressure valve.

As a further advantageous development of the invention the fluid path between the at least one receiver chamber and the piston space is a path controlled as regards its working cross section, it being expedient for both working chambers of the piston space to communicate with the receiver chamber via their own controlled fluid connection. As a control element it is possible to provide a control valve, as for example in the form of a 3/2 way valve, the control valves being integrated in the housing if desired in order to make a further contribution to compactness of the fluid power cylinder.

It would be possible to provide the pressurized fluid receiver with a plurality of mutually independent receiver chambers in which different amounts of fluid and/or different fluid pressures are available in order to provide for different operational characteristics in accordance with the respectively selected connection. It is in this manner that the speed and/or the acting force of the fluid power cylinder may be varied without any great complexity.

Further advantageous developments and convenient forms of the invention will be understood from the following detailed descriptive disclosure of embodiments thereof in conjunction with the accompanying drawings.

LIST OF THE SEVERAL VIEWS OF THE FIGURES

DETAILED ACCOUNT OF WORKING EMBODIMENTS OF THE INVENTION

Figure 1:
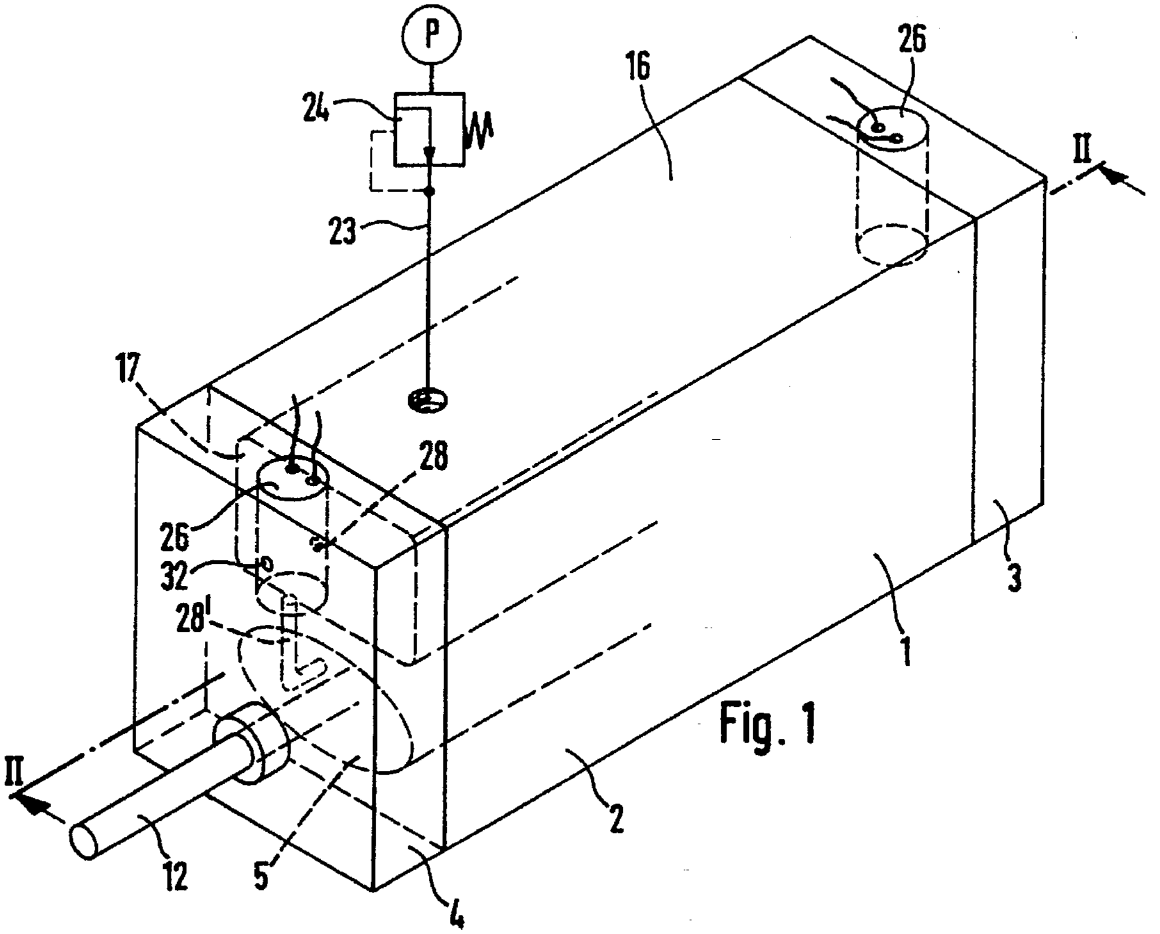
FIG. 1 shows a first design of the fluid power cylinder in accordance with the invention in perspective.

The fluid power cylinder presented in the following examples comprises a housing generally referenced 1, which is made up of a middle tubular section 2 and two end plates 3 and 4 or caps on its ends. In the tubular section 2 a piston space 5 is formed extending along the full length in a linear manner, and it possesses a cylindrical cross section.

The piston space 5 opens at both ends of the tubular section 2 where it is sealingly shut off by the end plates 3 and 4 mounted on it.

In the piston space 5 a piston 6 runs axially. It cooperates in a sealing manner with the internal peripheral wall of the piston space 5 which it axially divides into two working chambers 7 and 8. In a manner yet to be explained the two working chambers 7 and 8 are supplied with a fluid under pressure, referred in the following as a pressurized fluid in order to drive the piston 6 and cause same to perform a linear movement in the one or the other direction. In the illustrated working embodiment of the invention compressed air is utilized as the pressurized fluid.

The movement of the piston 6 is able to be transmitted to a point outside the housing 1. For this purpose the piston 6 is connected with a piston rod 12, which extends through at least one end plate 4 to the outside and whose outside section 13 renders possible connection with a load to be driven. In respective opening 14 in the end plate 3 a sealing and/or guiding device 15 is provided cooperating with the piston rod 12.

An integral component of the housing 1 and, in the present case, of the tubular section 2 is a pressurized fluid receiver or storage means 16. The housing 1 consequently combines the customary function of a casing and a receiver function. The pressurized fluid receiver 16 is, as shown in the embodiments of FIGS. 1 through 4, constituted by a receiver chamber 17, which is designed like the piston space 5 fitted as a cavity in the tubular section 2. The receiver chamber 17 preferably extends in parallelism to the longitudinal extent in the piston space 5 and the piston's engagement surface provided therein. It is open at the two opposite axial ends 18 and 18' of the tubular section 2 where like the piston space 5 it is shut off by the respective end plate 3 or 4.

Owing to the configuration as described of the piston space 5 and of the receiver chamber 17 it is possible to manufacture the tubular section 2 simply as an extruded or, respectively, drawn section, the piston space 5 and the receiver chamber 17 being formed directly in the course of production by extrusion. The tubular section 2 consequently constitutes practically a double tube component, at least the wall of the receiver chamber 17 not requiring any finishing after the extrusion process, since it does not present any running surface and does not have any moving parts sliding on it.

On the housing 1 and preferably on the tubular section 2 a connection port 22 is provided, which is accessible from the outside and opens into the receiver chamber 17. Via such connection port 22 the receiver chamber 17 may be connected with a source P of pressurized fluid. For instance the connection may be via a rigid or flexible duct 23, which is able to be detachably screwed into the connection port 22. The source P of pressurized fluid may for example be a compressor. This externally arranged pressurized fluid source P does not necessarily have to possess its own pressurized fluid receiver.

Via the pressurized fluid source P, which is preferably always connected, a certain volume of air is always kept available in the receiver chamber 17. The pressure of the pressurized fluid obtaining in the receiver chamber 17 is set as required using a so-called pressure reducer or a pressure regulating valve 24, which is placed in the path between the receiver chamber 17 and the pressurized fluid source P. It is in this manner that it is possible to ensure constant pressure levels in the pressurized fluid receiver 16. The pressure regulating valve 24 may be arranged somewhere along the duct 23, although it is preferably integrated in the housing 1.

The receiver chamber 17 and the piston space 5 are connected via at least one duct 25 and 25' for communication of fluid between them. It is in this manner that the piston space 5 may be supplied from the receiver chamber 17. Since the latter is located directly adjacent to the piston space 5, there is no substantial drop in pressure so that there is a highly satisfactory response characteristic as regards the motion of the piston. This will also be the case if the fluid power cylinder has a long working stroke.

Figure 2:
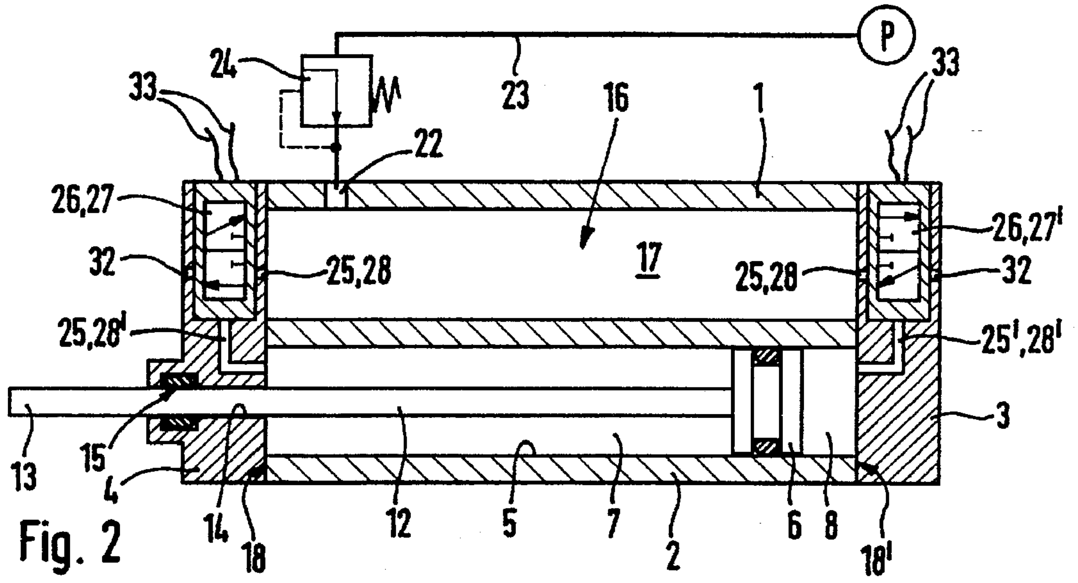
FIG. 2 shows a longitudinal section taken through the fluid power cylinder of FIG. 1 on the line II—II.
Figure 3:
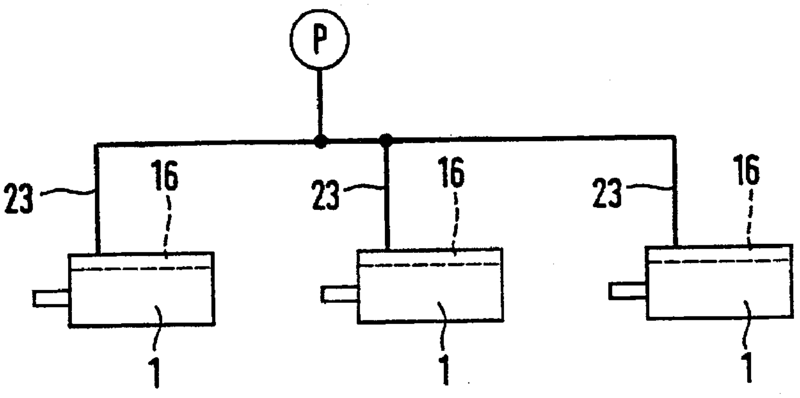
FIG. 3 is a diagrammatic representation of a pressurized fluid network including several fluid power cylinders in accordance with the invention.

In the case of the embodiment in accordance with FIGS. 1 through 3 both working chambers 7 and 8 are connected fluidwise, independently of one another, with the receiver chamber 17. In both cases it is a question of connections, which may be controlled or varied as regards the working cross section available for the pressurized fluid. Suitable control devices are indicated at 26 in FIGS. 1 and 2 and in the present case are constituted by control valves 27 and 27'. The two working chambers 7 and 8 are respectively connected via one of the above mentioned ducts 25 and 25' with the receiver chamber 17 and each of such ducts 25 and 25' is controlled by a control valve 27 and 27', which is preferably arranged on the respective duct. The control valves 27 and 27' of the present example of the invention are control valves, which selectively clear or completely shut off the passage through the associated duct 25 and 25'. It will however be clear that it would readily be possible also to employ control valves, with which intermediate settings between fully open and fully closed could be set, so-called proportional valves seeming particularly appropriate in this respect.

The control valves 27 and 27', in the present example, are integrated in the housing 1 of the working cylinder in order to achieve a space-saving configuration of the housing 1 of the working cylinder. For this purpose the two control valves 27 and 27' of the working embodiment are formed in the two oppositely placed end plates 3 and 4 or caps, in which they are preferably sunk. In this respect each control valve 27 and 27' communicates with several ducts, which extend in the interior of the associated end plate 3 and 4. In this case it is a question firstly of the above mentioned connection duct 25 and 25', which is divided up by the control valve 27 and 27' into two duct sections 28 and 28', of which the one opens into the receiver chamber 17 and the other opens into the associated working chamber 7 and, respectively, 8. Furthermore a venting duct 32 is present, which is also at one end connected with the control valve 27 and 27' and however at the other end opens into the surroundings at the outer surface of the associated end plate 3 or 4. Here it is naturally possible for ducts leading to other parts of the equipment or for silencers to be provided.

The control valves 27 and 27' in the present example of the invention are in the form of so-called 3/2 way valves and provide for two possible positions of switching. In the first switching position, the open one, the two duct sections 28 and 28' are joined with one another so that the two duct sections 28 and 28' are connected together and the passage through the respective connecting duct 25 and 25' is free. In the second position of switching, the turned off setting, the duct section running to the receiver chamber 17 is shut down, whereas the second duct section 28' is joined to the venting duct 32 so that the pressurized fluid can be displaced from the associated working chamber 7 or, respectively, 8. It is in this manner that the pressurized fluid receiver 16 serves as an internal pressurized fluid source, from which the working chambers 7 and 8 may be supplied as required and dependent on the position of switching of the control valves 27 and 27' a movement of the piston 6 in the desired direction can be caused to take place.

The control valves 27 and 27' are best in the form of electrically operated valves and may be solenoid valves. Electrical leads are indicated at 33.

Several fluid power cylinders of the type depicted in FIGS. 1 and 2 may be combined together as part of a pressurized fluid supply network, as is diagrammatically indicated in FIG. 3. In this case several fluid power cylinders are connected with a common pressurized fluid source P via the above mentioned ducts 23, such source P keeping the pressurized fluid receivers 16 of all fluid power cylinders charged in parallel. Since each fluid power cylinder is directly in the vicinity of its own pressurized fluid receiver 16, even in the case of simultaneous operation of all fluid power cylinders there will be sufficient pressure and air volume in each piston space in order to ensure reliable functioning.

Figure 4:
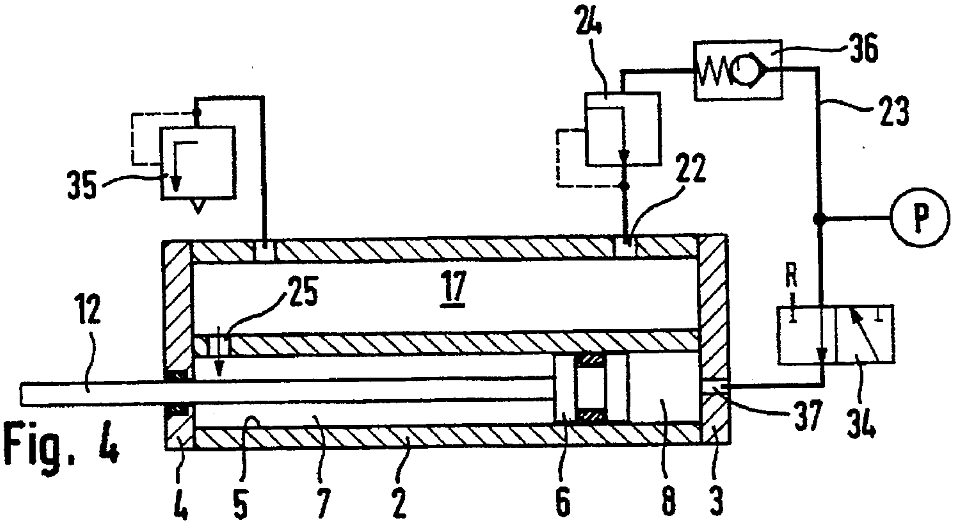
FIG. 4 shows a further working embodiment of the novel fluid power cylinder in a longitudinal section similar to the manner of representation of FIG. 2.

A further design of the fluid power cylinder in accordance with the invention is to be seen in FIG. 4. In this case only one of the working chambers 7 is connected for fluid supply with the receiver chamber 17, such connection being uncontrolled and continuous and being provided by a connecting duct 25 formed in the housing 1. The result of this is that the working chamber 7 connected with it is constantly provided with pressurized fluid and is maintained under pressure. The working chamber 7 so supplied with pressurized fluid is preferably the working chamber on the piston rod side so that the pressure of the fluid obtaining constantly acts on the unit comprising the piston rod and the piston in the retraction direction. The compressed air here has the function of a fluid spring constantly tending to shift the piston into an initial position against the end plate 3 remote from the piston rod 12.

The second working chamber 8 is in communication with the pressurized fluid source P via an intermediately placed control valve 34. In a first switching position of the control valve 34 the associated working chamber 8 is vented so that the piston 6, owing to the effect of the stored pressurized fluid, is held in the retracted initial position. After switching over the control 34 into a second switching position thereof pressurized fluid will pass from the pressurized fluid source P into the working chamber 8 and will displace the piston 6 against the return force toward the oppositely placed end plate 4. In this respect the air present in the chamber system consisting of the working chamber 7 about the piston rod and the receiver chamber 17 will be compressed so that the piston 6 will be forced into the initial position after the renewed switching over of the control valve 34.

It is convenient in this case if the receiver chamber 17 is connected with an excess pressure valve 35 which opens at a predeterminable rise in pressure in order to limit the pressure obtaining in the above mentioned chamber system and to ensure that the piston 6 may perform the maximum possible stroke.

The supply of fluid to the pressurized fluid receiver 16 is by way of a duct 23 of the already described type, which connects a connection port 22 in the pressurized fluid receiver 16 with the source P of pressurized fluid. In this case it is again expedient to provide a pressure regulating valve 24 on the duct. Furthermore in such connection a check valve 36 is placed in such connection or duct, which closes in the direction toward the pressurized fluid source P in order to prevent backward displacement of the fluid.

Both the excess pressure valve 36 and also the pressure regulating valve 24 and furthermore the check valve 36 may be integrated in the housing 1.

It will be apparent that the working chamber 8 remote from the piston rod 12 may be supplied, instead of by a direct connection with the pressurized fluid source P, via the receiver chamber 17, if the respective control valve 34 is arranged in the manner indicated in FIGS. 1 through 3 so that it may be switched in this manner.

As a material for the housing 2 it is preferred to utilize aluminum material. It is highly suitable for manufacture by extrusion. At this juncture it is however to be mentioned that the pressurized fluid receiver 16 may be more particularly designed for upgrading already existing conventional fluid power cylinders as well as an auxiliary stand-alone device fitted to the housing of the fluid power cylinder. The integration in the cylinder housing does however render possible a particularly compact configuration, since there is then the possibility of endowing the receiver chamber 17 with practically any desired cross sectional form and may be then optimally accommodated in the cross section of the housing.

In the case of the embodiment the fluid power cylinder is provided with a housing, which despite the integration of several cavities therein has a relatively flat overall form. This is rendered possible on the one hand because of the use of a ellipse-like, oval piston space 5 with a piston 6 having a corresponding configuration and on the other hand the associated receiver chamber 17 possesses a rectangular cross section with a relatively low height. The arrangement is such that the longitudinal axes of the cross sections of the piston space 5 and of the receiver chamber 17 placed thereover are aligned parallel to one another with the result that there is a minimum overall height.

It would be feasible to provide the fluid power cylinder with a plurality of receiver chambers 17. Same could be so connected with each other that the receiver or storage volume available is all in all increased. This would render it possible to provide a plurality of control chambers 17 in the interior of housing wall with a favorable arrangement thereof.

Figure 5:
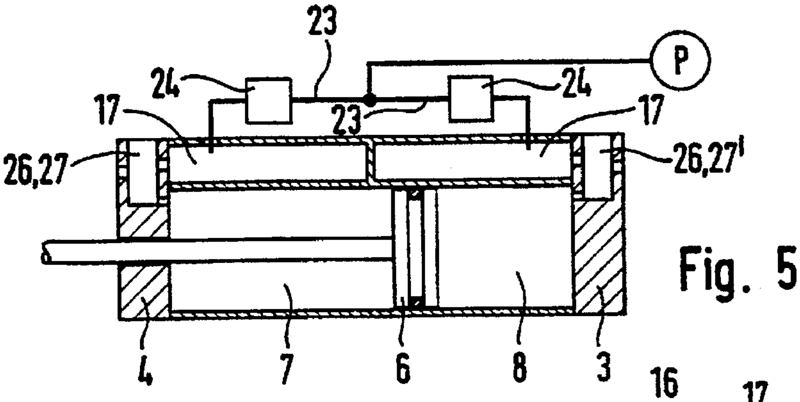
FIG. 5 shows a further embodiment of the fluid power cylinder in accordance with the invention, in the case of which a pressurized fluid receiver is provided having a multiplicity of chambers.

It would be feasible as well to adapt the overall configuration diagrammatically indicated in FIG. 5, in the case of which several receiver chambers 17 (here two thereof) are formed independently of one another and are employed for different internal pressures. This is something which may be provided for example if although all receiver chambers 17 are connected with the same pressurized fluid source P, each receiver chamber 17 is provided with its own pressure regulating valve 24, with which the receiver pressure may be preset as required. This arrangement renders possible the supply of the two working chambers 7 and 8 with different fluid pressures, it readily being possible for each working chamber 7 and 8 to be connected with all receiver chambers 17 in a controlled fashion in order, by operation of the respective control valve, to connect a respective working chamber with any desired receiver chamber 17.

In the diagrammatic representation of FIG. 3 the two receiver chambers 17 present are shown as being in tandem in the longitudinal direction of the housing. However it would be feasible to arrange the several receiver chambers 17 alongside each other and for them to extend, as illustrated in FIGS. 1 through 4, for the full length of the tubular section 2 in order to here to render possible simple manufacture by extrusion.

Figure 6:
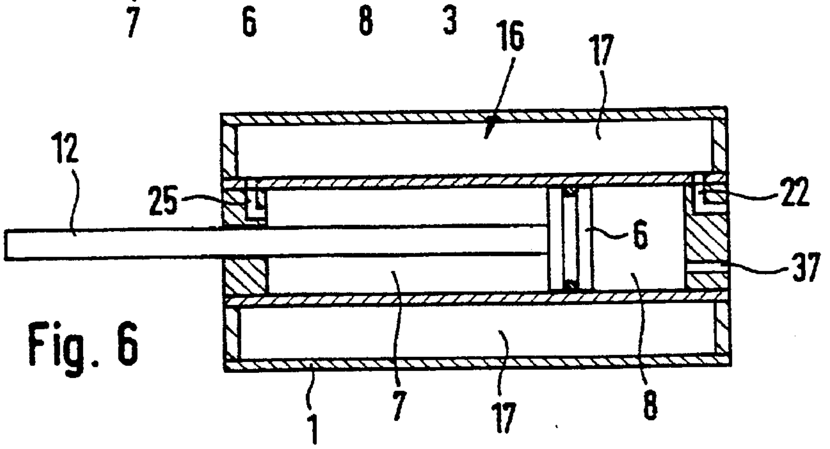
FIG. 6 shows a further design of the fluid power cylinder.

In accordance with a design indicated in FIG. 6 of the fluid power cylinder the receiver chamber 17 is generally in the form of a hollow cylinder and is provided with an annular cross section, it being arranged coaxially to the piston space 5 and encircling same concentrically or, respectively, coaxially. It is in this manner that it is possible to provide an arrangement which is particularly compact while at the same time possessing a high storage volume.

Furthermore the fluid power cylinder in accordance with FIG. 6 may be for example operate in the same manner as the cylinder in FIGS. 1 through 4. FIG. 4 illustrates such a manner of operation, one connection port 22 being shown, via which the receiver chamber 17 of the hollow cylinder pressurized fluid receiver 16 is able to be charged with a pressurized fluid at a certain pressure. This pressure might for example be of the order of 1.5 bar. Via a connecting duct 25 such pressure is made available to the working chamber 7. The other working chamber 8, not connected with the pressurized fluid receiver, is supplied with a higher pressure, such pressure being for instance of the order of 6 bar. The respective supply port in communication with the working chamber 8 is indicated at 37. The air displaced by the piston 6 from the working chamber 7 into the receiver chamber 17 is available, on venting the working chamber 8, to move the piston 6 back into the initial position thereof. The displaced air is consequently not lost and is practically retained so that there is a substantial air saving effect.

I claim:

1. A fluid power cylinder, comprising:

a housing in which a piston space is defined for a piston able to be driven in response to fluid actuation, wherein such housing possesses a pressurized fluid receiver adapted to be supplied by a pressurized fluid source and which is provided with at least one receiver chamber connected with the piston space in a fluid conducting manner, and wherein the receiver chamber possesses a rectangular cross section.

2. A fluid power cylinder, comprising:

a housing in which a piston space is defined for a piston able to be driven in response to fluid actuation, wherein such housing possesses a pressurized fluid receiver adapted to be supplied by a pressurized fluid source and which is provided with at least one receiver chamber connected with the piston space in a fluid conducting manner, wherein the receiver chamber of the pressurized fluid receiver is constantly connected with one of the working spaces separated from each other in the piston space by the piston, and wherein the receiver chamber is provided with an excess pressure valve connected with it.

3. A fluid power cylinder, comprising:

a housing in which a piston space is defined for a piston able to be driven in response to fluid actuation, wherein such housing possesses a pressurized fluid receiver adapted to be supplied by a pressurized fluid source and which is provided with at least one receiver chamber connected with the piston space in a fluid conducting manner, wherein the fluid connection between the at least one receiver chamber and the piston space is a connection able to be controlled as regards the working cross section thereof, wherein the fluid connection comprises at least one control valve, and wherein each respective control valve is fitted in an end plate of the housing.

4. The fluid power cylinder as set forth in claim 3, wherein said control valve comprises a 3/2 valve.

5. A fluid power cylinder, comprising:

a housing in which a piston space is defined for a piston able to be driven in response to fluid actuation, wherein such housing possesses a pressurized fluid receiver adapted to be supplied by a pressurized fluid source and which is provided with at least one receiver chamber connected with the piston space in a fluid conducting manner, and a pressure regulating valve placed between the pressurized fluid receiver and the pressurized fluid source.

6. The fluid power cylinder as set forth in claim 5, comprising a check valve connected in series with the pressure regulating valve.

7. The fluid power cylinder as set forth in claim 5, wherein the respective valve is incorporated in the pressurized fluid receiver or in the housing.

* * * * *